United States Patent Office 3,516,841
Patented June 23, 1970

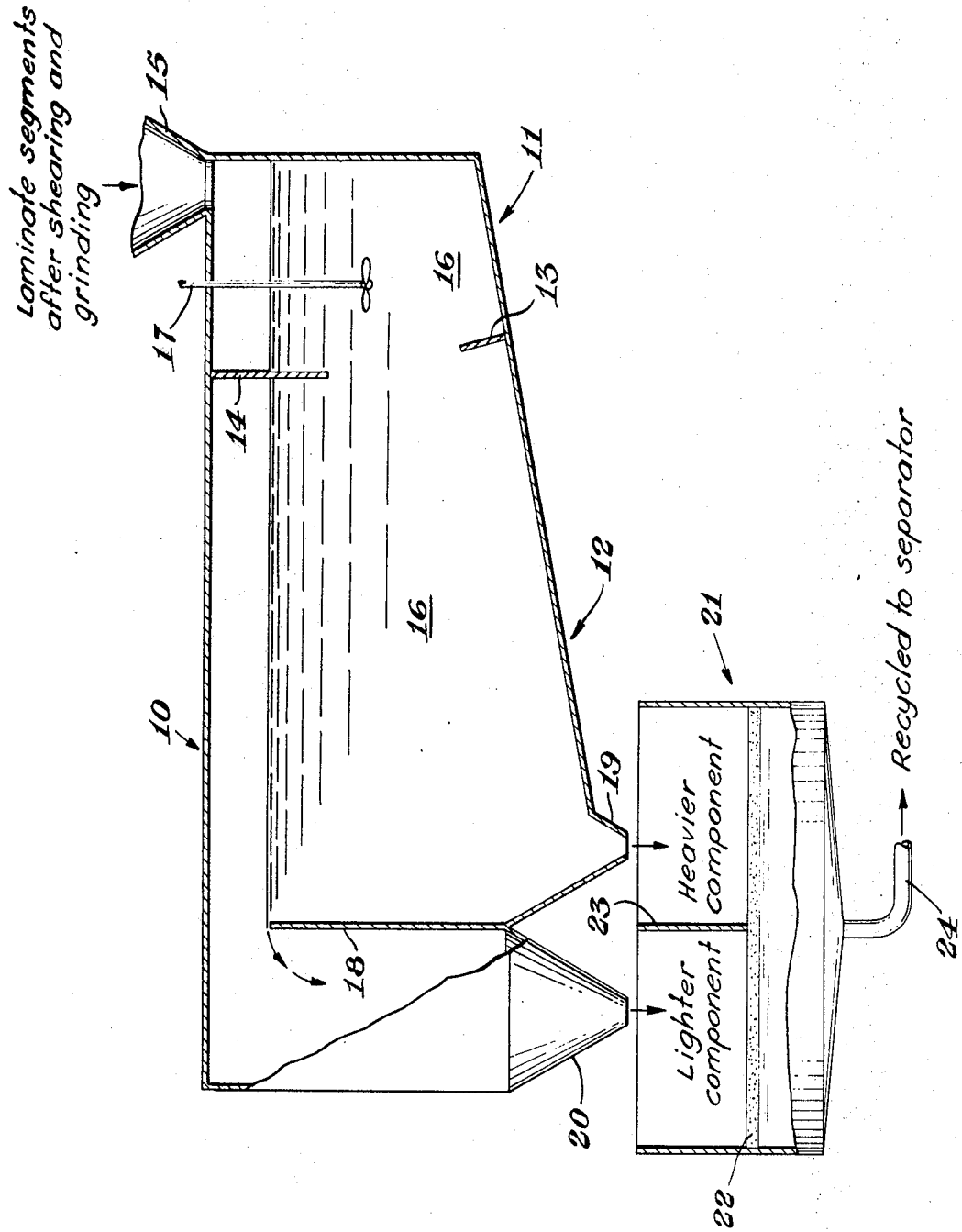

3,516,841
SEPARATING AND RECLAIMING OF COMPONENTS FROM METALLIC-PLASTIC LAMINATE STRUCTURES
Gerrit Haveman, Amsterdam, Noordholland, Netherlands, assignor to The Dow Chemical Company, Midland, Mich., a corporation of Delaware
Original application Mar. 14, 1963, Ser. No. 265,217, now Patent No. 3,335,966, dated Aug. 15, 1967. Divided and this application Feb. 20, 1967, Ser. No. 661,483
Int. Cl. C08f 27/04; C08g 53/22
U.S. Cl. 106—193
6 Claims

ABSTRACT OF THE DISCLOSURE

The present invention relates to a method of converting an aluminum-plastic laminate structure into an aluminum oxide-filled plastic raw material which can be used for fabricating other products.

---

This is a divisional application of Ser. No. 265,217, filed Mar. 14, 1967, now U.S. Pat. 3,335,966 now abandoned.

The combination of transparent or semitransparent plastic materials with metallic materials in permanent joined relationship is becoming increasing popular for the aesthetic and decorative effects created by such a combination. Although block-like or the more or less three dimensional shapes have been produced by laminating relatively thick plastic layers with usually thin metallic layers for various end uses, a more pronounced utility of such joining of metallic and plastic components has been in the area of films, foils, yarns, threads and the like. For example, "metallized" yarns and threads have enjoyed growing popularity in the textile and associated apparel and decorative fields. They are employed in a number of end uses (including wearing apparel and home and automobile upholstery) to provide, principally, an aesthetic and most attractive and desirable glitter and lustrous appearance. The more successful yarns and threads of this nature involve, in one form or another, a metal film or other deposit (as a foil) between plastic layers which may either be film or plastic coating materials. Essentially, the plastic layers provide structural and physical characteristics and, even more important, protect the metal film (which may be a vaporized metal deposit or a metal foil) against degradation through tarnishing, chemical attack, abrasion and the like.

In the preparation of such laminate structures, there is, of course, associated with the manufacture a certain amount of waste material which may vary in quantity from time to time. This waste material may be simply from trimmings or from the "leaders" or "tails" of the film or foil structures that are laminated together. Ordinarily, these leaders and tails of the laminate structure are of inferior quality. Additionally, waste material may be derived through poor lamination, wrinkling and scoring of the laminate structure as well as through such sources as laminate structures of off shade color from that which was desired and so forth. As can be appreciated, the components that go into making up these laminate structures are ordinarily of relatively expensive origin. Accordingly, it would be desirable and highly advantageous if a means could be developed for conveniently, efficiently and inexpensively recovering the components in a reusable form or converting the waste material to a more usable form so that complete loss of the cost of the materials could be avoided.

It is an object of the present invention to convert waste portions of metallic-plastic laminate structures into a reusable condition for subsequent use.

In a more specific sense, the invention encompasses four particular aspects, all of which are derived for the purpose of converting waste portions of metallic-plastic laminate structures into reusable and valuable raw materials. These are (1) separation of the metallic component from the plastic component and individually recovering each essentially free of contamination of the other; (2) separating the metallic component from the plastic component in such a manner that a random mixture of the two components itself can be reused, and when aluminum is the metallic component of the laminate structure; (3) recovering the plastic component completely free of aluminum for reuse in other processes and products; and (4) converting an aluminum-plastic laminate structure into an aluminum oxide-filled plastic raw material which can be used for fabricating other products.

These and still further objects and advantages are readily achieved by practice of and in accordance with the present invention as follows. In respect of (1) above, waste portions of metallic-laminate structures are severed into relatively small segments; the segments are subjected to a shearing force sufficient to free the metallic component from the plastic component; the severed and sheared segments are dispersed in a liquid medium having a density greater than one component and less than the other component; the heavier component is then drawn from the bottom of said liquid medium and the lighter component is drawn off from the top of said liquid medium; and, subsequently, each component is separated from any liquid medium accompanying it.

With respect to (2) above, the metallic-plastic laminate structure is treated similarily as in the foregoing excepting instead of dispersing the severed and sheared segments in a liquid medium, a random mixture of the components is recovered directly after the severing and shearing operation, which mixture can be directly fabricated into a solid shaped article.

With regard to (3) above, wherein the metallic component of the laminate structure is aluminum, the laminate structure is severed into relatively small segments; the severed segments are subjected to a shearing force sufficient to free most of the aluminum from the plastic component; the severed and sheared segments are dispersed in an aqueous medium having a density greater than one component and less than the other component, and which aqueous medium has dispersed therein a small amount of mercuric chloride; and, subsequently recovering from the liquid medium the plastic component completely free of any aluminum contamination by withdrawing the plastic component from the top of the aqueous medium and separating the plastic component from any accompanying aqueous medium.

With regard to (4) above, and wherein the metallic component is aluminum, the aluminum-plastic laminate is severed into relatively small segments; the segments are subjected to a shearing force sufficient to free most of the aluminum from the plastic component; the severed and sheared segments are dispersed in a dilute aqueous solution of mercuric chloride; the solid material is recovered from the aqueous medium; and, subsequently the recovered solid material is dried to convert the aluminum hydroxide formed in the previous step to aluminum oxide and provide an intimate, random mixture of plastic material and aluminum oxide.

The present invention provides an efficient and inexpensive means for converting what was ordinarily useless waste material into a useful and valuable raw material. Thus, the plastic and metallic components can be individually recovered and reused in any manner in which they were normally used in their original state, such as, the plastic may be remelted and extruded into various and sundry shapes, or, it can be blended with additional material of the same composition for fabrication or other purposes. Similarly, with the metal component, it can be melted or otherwise fabricated into useful articles or blended with similar or other materials for alloying purposes and the like. Additionally, the laminate structure can be converted into a uniform mixture of metal and plastic materials which can directly be fused and fabricated, or, blended with other suitable material and fused or otherwise plasticized and made suitable for fabrication techniques and fabricated into various articles. Or, in the case where the metallic component is aluminum and it is not of importance or otherwise necessary or desirable to recover the aluminum, or when it is more desirable to obtain a highly pure state of the plastic material, this can readily be accomplished in accordance with the present invention. And, furthermore, when aluminum is the metallic component of the laminate structure, the structure can be converted into a useful raw material comprising the plastic material "filled" with aluminum oxide. This latter material finds utility particularly in areas where good dielectric or heat conductive properties are required of the article.

Additional objects and advantages of the invention and its numerous cognate benefits and features, are further manifest in the ensuing description and specification taken in conjunction with the accompanying drawing.

With reference to the drawing, there is schematically illustrated one means for carrying out the method of the invention. A separator, generally designated by the reference numeral 10, comprises essentially two zones, one of which is an agitation zone 11 and the second is the settling and separation zone 12. Separator 10 is beneficially a closed tank (which may have an open top) having a generally downwardly sloping bottom from the agitation zone towards the settling and separating zone. Agitation zone 11 is not totally separated from settling and separating zone 12 but is generally so defined by baffles 13 and 14.

In the practice of the invention, the cut, sheared and ground laminate segments, that is the laminate structure which has been cut into relatively minute segments, and after being subjected to a shearing and grinding operation to further reduce the size of the segments and to free the metallic component from the plastic component, is fed into the separator through hopper 15. Upon entering the separator, it is dispersed in liquid medium 16, which has a density between the densities of the metallic and plastic components, by the action of agitator 17. The liquid medium containing the dispersed laminate segments is allowed to flow by gravity towards the settling and separating zone, during which time the heavier component (which is in most all cases the metallic component) settles to the bottom of the liquid medium and the lighter component (which in most all cases is the plastic component) floats to the surface of the liquid medium. The heavier component together with some of the liquid medium flows out from the settling and separation zone through outlet 19 and the lighter component together with some of the liquid medium flows over baffle 18 and out of the settling and separation zone through outlet 20. Both components together with some of the liquid medium flow into collector 21 which is separated into two compartments in its upper half by baffle 23. The liquid medium containing the component then flows down upon filter 22 whereat the components are retained on top of the filter, and the liquid medium passes on through the filter and is subsequently withdrawn through outlet 24 and recycled back into settler 10. The recycled liquid medium can be introduced through a separate inlet into the top of settler 10 or it can be added together with the laminate segments through hopper 15 which beneficially aids in facilitating dispersion of the laminate segments in the liquid medium. The plastic and metallic components are recovered from the top of the filter from time to time or they can be recovered continuously by known methods.

The laminate waste material that is fed through the separator is conveniently prepared by precutting the material in a suitable cutter or breaker to about 5-centimeter or 2-inch square chips or pieces and then subsequently further grinding the pieces in another suitable crush-cut mill provided with a sieve having openings on the order of about 1/128 inch or about 0.2 millimeter. Although conveniently, this operation is performed in two separate steps, the cutting to the required size and applying the shearing force to the laminate structure to free the metal from the plastic can be accomplished in one operation. Any suitable equipment can be used for this purpose that is adapted to cut and apply the necessary shearing force or action to the laminate structure to free essentially all of the metal from the plastic. Ordinarily, any such action which provides a crushing or shearing effect will free the metal component including such means as ball and roll mills and the like. Other suitable means for freeing the metallic component include gear crushers wherein the laminate particles are passed between counter-rotating gear-like teeth or by agitating the segments with blades rotating at high speed.

The agitation that is used to disperse the laminate material in the liquid medium should only be a gentle agitation to sufficiently disperse the material and allow the metal component to free itself from the plastic component by the difference in gravity. Excess agitation will merely stir some of the plastic material to the bottom and some of the metal material to the top which will require additional time to rise or settle.

The laminate structures that can be treated in accordance with this invention can be of most any combination of metal and plastic that can be laminated together. As indicated, the laminate structures that are beneficially those that are of the film and foil dimensions wherein mostly thin layers of both the plastic and the metal are involved. For that matter, many times the metal layer is a metal deposit which is applied to the film by suitable vacuum vaporizing methods. Advantageously, the laminate structures that are treated in the practice of the present invention are the structures that are prepared according to the teachings disclosed in U.S. Pat. Nos. 2,714,569; 2,772,994; and 2,974,055, as well as in various other places.

In general, about 4 different methods have been commonly employed in preparing the laminate structures so advantageously processed according to the instant invention. In one method, a metal foil is laminated, with a suitable adhesive or with pressure and heat, between two transparent thermoplastic films. In another, a thermoplastic film is metallized on both sides and this is laminated between two transparent thermoplastic films. In yet another method, one side of a transparent thermoplastic film is metallized and the metallized side is laminated to a second thermoplastic film or, alternatively two of the metallized films may be laminated together in a metal-to-metal fashion. In still another method, a transparent plastic film is metallized on one or both sides and a plastic coating is applied over the metallized surface. Various modifications and combinations of the foregoing may also be had.

The plastic component may be selected from any of a wide variety of plastic materials. "Plastics" as used herein is intended to mean that variety of plastics that are normally solid, relatively high molecular weight polymeric substances.

Most any type of transparent (or semi-transparent) plastic film or sheet can be used in the laminate structures processed in the practice of the invention. Ordinarily, thermoplastics are employed although other suitable plastic film products can also be used. These include copolymers of vinylidene chloride and vinyl chloride or acrylonitrile (and the like) that generally contain in the polymer molecule at least about 70, and preferably at least about 80, weight percent polymerized vinylidene chloride. Other films that are well adapted for use in the practice of the invention are those of other halo-ethylene polymers, such as polyvinyl chloride, vinyl chloride/vinyl acetate and other vinyl chloride copolymers, and so forth, as well as such other halogen-containing polymer products as chlorinated polyethylene, chlorinated polypropylene, chlorinated rubber and the like. Films comprised of such thermoplastic film-forming materials as the various styrene polymers, including polystyrene, film-forming copolymers of styrene with acrylonitrile, alpha-methyl styrene, ethyl acrylate and the like and mixtures thereof as well as various vinyl toluene polymers, acrylonitrile polymers, cellulose acetate, cellulose acetate butyrate and other thermoplastic, film-forming derivatives of cellulose, monoolefinic hydrocarbon polyolefins, including polyethylene (of both the conventional branch structured "polythene" type of polymer and the more recently available linear, so-called macromolecular, high density varieties) and polypropylene, polyamides, including linear condensation products of adipic acid and hexamethylene diamine (nylon "6") and condensation products of epsilon-caprolactam (nylon "6") and the like can be employed in the practice of the invention. Particularly beneficial in this repect are films of the several well known film-forming polyesters including linear condensation products of terephthalic acid and ethylene glycol ("Mylar") and the like or equivalent glycols.

The metal that is used in the laminate structure will depend in part upon for what purpose the structure was originally manufactured. Ordinarily, the metal is of a type that has or will provide a specular appearance when interlaminated but this is not a requirement for the laminate structures treated according to the present invention. The metal can be any one that can be suitably laminated with the plastic and includes, for example, gold, silver, zinc, magnesium, titanium, tin, aluminum and so forth.

The liquid medium in which the sheared or ground laminate segments are dispersed, as mentioned before, has a density between the density of the metal component and the plastic component so that a separation of the components is achieved by gravity forces within the liquid medium. The density required of the liquid medium can be readily determined once the densities of the components are known. Beneficially, the greater the density differences between the density of either the metal and the plastic component and the density of the liquid medium, the more effective and rapid will be the separation of the two components. Of course, in this same connection, the greater the density difference between the two components the more readily will the separation in the medium be achieved.

Any liquid medium that can be made to have a density between the densities of the laminate components can be utilized in the practice of the invention provided the liquid medium is inert or at least relatively inert to both the metal and plastic components, particularly when it is desirable that both the components be recovered for reuse. Aqueous solutions are preferred from the standpoint of ease of preparation and from the attendant benefits of economy, ease of handling, and absence of or minimum toxicity. Exemplary of some of the solutions that can be used for separating the plastic and metal components are those of the aqueous solutions of calcium chloride, magnesium chloride, aluminum chloride, zinc chloride, sodium chloride, stannis chloride, and the related salts wherein the common cation is employed with the other anions including the other halides as well as thiocyanate, nitrate, sulphate, and so forth. Preferably, aqueous solutions of calcium chloride are employed from the standpoint of availability and relative inertness to most of the components encountered in the laminate structures. Additionally, other solutions such as organic solutions involving aqueous and non-aqueous solutions of polyglycols and polyethers and the like which can be made to have densities necessary to effectuate the necessary separation of the components can be employed.

The amount of the laminate material that is added to the liquid medium is not particularly critical, but it may have an effect on the rate and efficiency of separation. That is, when too much of the laminate material is added at one time some entrainment of one component in the other may occur. Ordinarily, relatively small weight quantities of the laminate material per weight of the solution are employed. Of course, if larger amounts of laminate material are added equally good separation can be effected by allowing longer settling times.

When, as indicated, aluminum is the metal in the laminate structure and it is desirable to reclaim 100 percent metal free film (or in cases where it is not particularly desirable to reclaim the aluminum) the particular aspect of the invention of employing mercuric chloride to assist in the removal of the aluminum from the film is employed. This is best performed by adding from about 1 to 10 grams per liter of mercuric chloride to the aqueous salt solution or other aqueous medium, after which, the severed and sheared laminate structure is added to the aqueous solution before the mercuric chloride is introduced. In this aqueous medium the combination of the aluminum and the mercuric chloride creates a reaction which involves the formation of a mercury/aluminum amalgum which apparently had the property to split water violently into nascent oxygen and hydrogen which in turn supplies the proper conditions for the fast oxidation of the aluminum to aluminum hydroxide. This method has been found to be very efficient in the removal of all of the aluminum from the plastic film without damaging the film or plastic itself.

However, when the addition of the mercuric chloride is employed, the reaction should be carefully controlled when certain plastic materials are involved since the reaction is an exothermic one and high temperatures may cause damage to the film. For example, when the plastic material is cellulose acetate butyrate, excess rises in temperature should be avoided since the high temperature will cause partial saponification of the cellulose acetate butyrate. Ordinarily, the reaction between the aluminum and the mercury will begin at about 40° C.

If desirable or necessary, the recovered components can be further treated in any manner to further purify them or remove extraneous and occluded materials. For instance, it may be desirable to treat them to remove any adhering pigments, adhesives, finishes and the like.

The remainder of the separation is similar as that explained hereinbefore, that is, the plastic material will ordinarily float to the surface and be recovered from the top portion of the aqueous solution whereas, the aluminum hydroxide will settle to the bottom and be withdrawn therefrom.

Instead of adding the aluminum containing laminate structure to the aqueous separation medium containing the mercuric chloride, it may be added directly to an aqueous solution of mercuric chloride. Beneficially the concentration of the mercuric chloride solution, which must be an aqueous solution, is between about 0.1 and 1 weight percent. When this method is employed, the reaction of forming aluminum hydroxide is achieved as before. However, instead of separately recovering the plastic from the aluminum hydroxide, the combination of all the solid material in the aqueous mercuric chloride solution so-formed can be recovered together by filtering the solution. The solids, i.e., a mixture of principally plastic and aluminum hydroxide, can then be dried which converts the aluminum hydroxide to aluminum oxide and provides a plastic material which is "filled" with aluminum oxide. This, then, provides an excellent raw material which can be molded into articles or blended with other materials to produce articles having enhanced dielectric and heat conductive properties. Depending on the quantity of the aluminum oxide in the material so formed, the folded or fabricated pieces thereof may become too brittle, and it may be desirable to blend this material with additional plastic material before fabricating, or to blend it with a plasticizer or similar material to lessen the rigidity and brittleness of the product.

The mercuric chloride acts principally in a catalytic manner and therefore is not used up to any great extent. Thus, the reactions involved when the mercuric chloride treatment is utilized can be represented by:

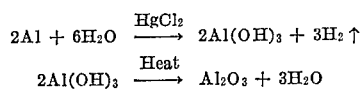

$$2Al + 6H_2O \xrightarrow{HgCl_2} 2Al(OH)_3 + 3H_2 \uparrow$$

$$2Al(OH)_3 \xrightarrow{Heat} Al_2O_3 + 3H_2O$$

Makeup solution of the mercuric chloride can be added from time to time or on a continuous basis when continuous processing is employed if it is determined that the reaction is slowing down or the plastic material is not being entirely freed from the aluminum. As indicated, the reaction evolves heat so that treating of relatively small quantities of the laminate material at any one time is desirable.

The invention is further illustrated in and by the following examples, wherein, unless otherwise specified, all parts and percentages are by weight.

EXAMPLE 1

Laminate waste material collected from sheets, edge trimmings and the like and fabricated from a thin sheet of aluminum securely interlaminated between two thin sheets of cellulose acetate butyrate was cut into pieces having a maximum dimension of about 2-inches. These pieces were then forwarded through a Peppink crush-cut mill having a sieve with $\frac{1}{128}$ inch opening so that the exiting material had a maximum dimension of about $\frac{1}{128}$ inch. The shearing and grinding action freed, on the average, about 99 percent of the aluminum from the butyrate.

The resulting mixture of aluminum and butyrate was then fed to a separator according to the procedure discussed in connection with the drawing. The aqueous medium employed was an aqueous solution of calcium chloride having a specific gravity of about 1.33. The aluminum (sp. g. about 2.7) settled to the bottom, while the butyrate (sp. g. about 1.3) floated to the top of the solution and both the aluminum and butyrate were recovered essentially completely free of each other in accordance with the procedure outlined with reference to the drawing.

EXAMPLE 2

The procedure of Example 1 was repeated expecting that instead of passing the mixture of aluminum and butyrate to the separator, the mixture was used as the charge to a screw fed injection molding apparatus. It was found that the mixture was relatively easy to dose feed and remained homogeneous throughout the molding process. The mixture was molded into a plug-like shape (of which over a million were made following this technique) having excellent appearance and functional properties. For example, the molded product has good electrical conductivity properties and can be advantageously employed in applications where static charges are troublesome when the plastic is singly used.

EXAMPLE 3

The method of Example 1 was repeated excepting that before the mixture of aluminum and butyrate were added to the calcium chloride solution, which was maintained at about 40° C., about 4 grams/liter of $HgCl_2$ were added to the solution. After the mixture was added, the temperature of the solution began to rise indicating the oxidation of the aluminum to aluminum hydroxide. The reaction was controlled so as not to allow excessive temperature rises by adding only small amounts of the mixture to the solution. The aluminum hydroxide formed (sp. g. about 2.4) settled to the bottom of the solution and the butyrate floated to the surface and was recovered completely free of aluminum.

EXAMPLE 4

The procedure of Example 1 was repeated excepting to add a small amount of the mixture of aluminum and butyrate to an aqueous solution of about 0.5 weight percent $HgCl_2$ while continuously stirring the solution. After essentially all of the aluminum had been oxidized to aluminum hydroxide as indicated by no further increase in temperature, the solids, consisting essentially of aluminum hydroxide and butyrate, were recovered from the solution by filtration. The solids were then dried to convert the mixture into a homogeneous mixture of aluminum oxide and butyrate.

This latter mixture is conveniently blended with a plasticizer (or processed directly) and molded into shaped articles by injection molding and the like. The resulting products, like those of Example 3, have good electrical conductivity properties.

Similar excellent results to the foregoing are achieved when other laminate products are treated, including those wherein the plastic material is polymerized ethylene glycol terephthalate or polypropylene and others, and wherein the metal is tin or others that are suitably laminated as indicated hereinbefore.

What is claimed is:

1. The method of converting a waste laminate structure comprised of aluminum and plastic components into an aluminum oxide filled plastic material comprising the steps of
   (a) subjecting relatively small segments of said laminate structure to a shearing force sufficient to free said aluminum component from said plastic component;
   (b) dispersing the mixture of said components in a dilute aqueous solution of mercuric chloride;
   (c) recovering the solid material from said aqueous solution, said solid material consisting essentially of said plastic component and aluminum hydroxide; and,
   (d) subsequently drying said recovered solid material to convert said aluminum hydroxide to aluminum oxide.

2. The method of claim 1, wherein said dilute aqueous solution of mercuric chloride contains from about 0.1 to about 1 weight percent mercuric chloride, based on the weight of the solution.

3. The method of claim 1 with the additional step of converting the dried mixture of plastic material and aluminum oxde recovered in step (d) into a solid-shaped article by subjecting said mixture to a fabrication technique.

4. The method of claim 1, wherein said plastic component is polymerized ethylene glycol terephthalate.

5. The method of claim 1, wherein said plastic component is cellulose acetate butyrate.

6. The method of claim 1, wherein said plastic component is polypropylene.

No references cited.

MORRIS LIEBMAN, Primary Examiner

R. H. ZAITLEN, Assistant Examiner

U.S. Cl. X.R.

260—40, 41B; 106—193, 198; 241—14, 20